April 5, 1949.  E. F. McDONALD, JR  2,466,553

HEADREST

Filed June 25, 1945

INVENTOR.
EUGENE F. McDONALD, Jr.
BY David M. Davis
HIS ATTORNEY

Patented Apr. 5, 1949

2,466,553

UNITED STATES PATENT OFFICE 2,466,553

HEADREST

Eugene F. McDonald, Jr., Chicago, Ill.

Application June 25, 1945, Serial No. 601,412

2 Claims. (Cl. 155—177)

This invention relates to seats, and more particularly to headrests provided in such seats.

When one remains in a seat for long periods of time, as when driving a vehicle, such as an automobile or airplane, for long distances, signs of fatigue appear in the neck muscles and tend to distract one's attention from proper operation of the vehicle and to cause much discomfort.

It is a principal object of the invention to provide a new and improved headrest for seats which greatly reduces discomfort attendant upon remaining in the seat for long periods of time, and which increases the safety of driving a vehicle equipped with a seat having such a headrest.

It is a specific object of this invention to provide such a new and improved headrest for seats, particularly useful in vehicles, which is especially designed to relieve the tension on neck muscles.

The features of the present invention which are believed to be novel are set forth with particularity in the appended claims. The present invention itself, both as to its organization and manner of operation, together with further objects and advantages thereof may best be understood by reference to the following description taken in connection with accompanying drawings in which:

Figure 1:
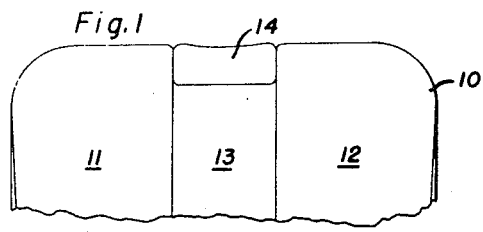
Figure 1 illustrates the upper portion of a seat embodying the invention in retracted position.

In Figure 1 the upper portion 10 of a seat covered with cloth or leather upholstery has two side panels 11 and 12 and a center panel 13. The upper portion of the center panel 13 is depressed with respect to the upper portions of the side panels 11 and 12 to form a cavity which receives a headrest cushion 14, which conforms with the general contour of the back 10 of the seat when the headrest 14 is within the cavity.

Figure 2:
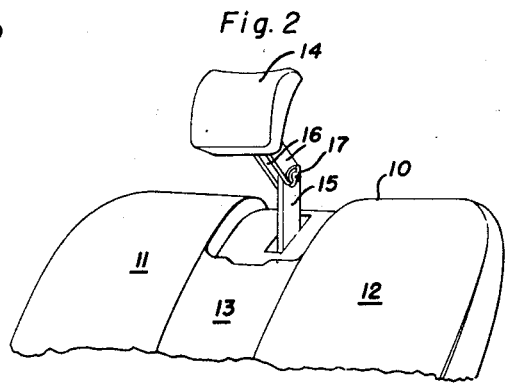
Figure 2 illustrates in perspective the upper portion of the seat of Figure 1 with the invention in extended position.

In Figure 2 the headrest 14 is illustrated as withdrawn from the cavity above the center panel 13, and is supported in that operative position on a resiliently movable bar 15 to which it is connected by links 16 fastened with a bolt and wing nut 17 to the bar 15. Spring washers are preferably provided in connection with the wing nut and bolt 17 to provide substantial friction between the bar 15 and the links 16 so that normal pressure of the head against the headrest 14 does not change the relative position of the parts, but so that one may readily force the headrest 14 back and forth manually around the pivot formed by the bolt and wing nut 17 to any desired position of the headrest 14.

In addition a friction pivot joint is provided between the headrest 14 and the links 16 so that the headrest 14 may by suitable force by turned to any desired angle with respect to the links 16. Also, the bar 15 is mounted on a pivot at some distance below the top of the back 10 of the seat and is pressed to a forward position by means of a spring whose resilience is such that the headrest 14 resiliently cradles one's head to relieve tension in the neck muscles. The bar 15 is also provided with mechanism whereby it may be moved vertically to adjust the headrest 14 to any desired height, and so that it may be locked at such desired height, or retracted entirely within the back 10 of the seat.

Figure 3:
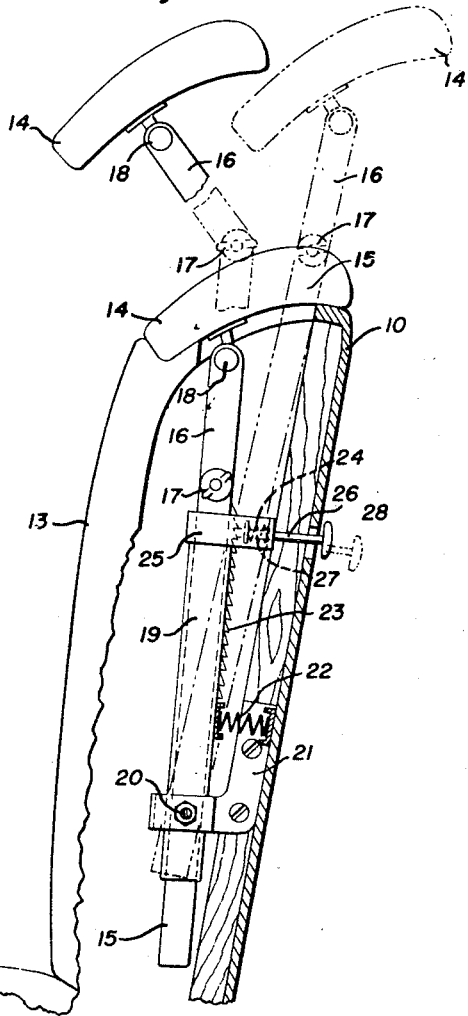
Figure 3 is a detail view in section showing the internal construction of the invention embodied in such a seat.

In Figure 3 the details of such pivoting and locking arrangements are shown. Throughout the drawings the same reference numerals are applied to like parts. The headrest 14 is shown in full lines in retracted position in the cavity above the center panel 13 of the seat back 10, and the pivot 18 is illustrated connecting the headrest 14 with the links 16. The links 16 are in straight line relation with the bar 15 which rests in its lowermost position within a U-shaped channel 19. The channel 19 is pivotally supported by pivot-screws 20 on a suitable bracket 21 which is fastened to the structural framework of the seat back 10 and a helically coiled spring 22 bears at one end against the U-shaped channel 19 and at the other end against the rearward portion of the structural framework of the seat back 10 so as to maintain channel 19 and the bar 15 carried by it in a forward position.

The rear edge of the bar 15 extends a little distance out of the open side of the channel 19, the opening of which faces backward, and this rear edge of the shaft 19 is provided with teeth 23, each of which has a substantially horizontal lower edge and an upper edge displaced at a moderate angle from the vertical. These teeth 23 cooperate with a locking arrangement 24 to maintain the bar 15 and the headrest 14 carried thereby at any desired elevation. The locking arrangement 24 includes a supporting strap 25 fastened to the upper end of the channel 19 and carrying a toothed dog 26 biased by a spring 27 into engagement with the teeth 23. A handle 28 is fastened to the dog 26 and is located behind the back 10 of the seat where it may be reached to retract the dog 26 from engagement with the teeth 23 to allow lowering of the headrest 14.

In operation, the headrest 14 may be lifted from its retracted position and the shape of the teeth 23 allows such lifting without touching the handle 28. When the headrest 14 is raised enough, it may be pulled forward so that the links 16 pivot around the upper end of the bar 15, and it may also be turned around the pivot 18 to any desired position to accommodate one's head. The resilience of the spring 22 is such that the natural weight of one's head moves the headrest 14 slightly backwards so that the head is comfortably cradled to relieve tension on the neck muscles. In the dotted line 2 of Figure 3, the headrest 14 is illustrated in a position in which the spring 22 is completely depressed as far as it may be. If it be desired to dispense with the headrest 14, one may reach over the back of the seat and pull the handle 28 so that the headrest 14 may be lowered within the cavity above the center panel 13.

Figure 4:
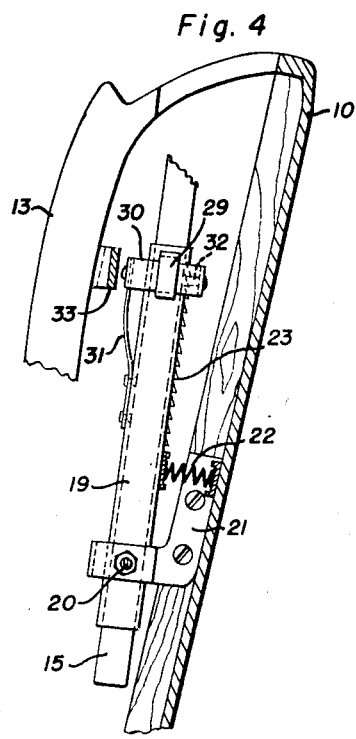
Figure 4 illustrates in section structural details of an alternative form of internal operating mechanism.

In Figure 4 an alternative arrangement is illustrated in which the headrest may be lowered by pulling it a short distance forward to disengage the teeth 23 and allow lowering of the bar 15. In this arrangement the bar 15, channel 19, pivot screws 20, bracket 21, and spring 22 are like the similarly numbered parts illustrated in Figure 3. At the upper end of channel 19 a strap 29 is fastened around a collar 30 which is slidable across the end of the channel 19 and which is pressed by a spring 31 to a forward position in which a dog 32 fastened to the collar 30 engages the teeth 23. An abutment 33 is fixed on the structural framework of the seat at a position just in front of the collar 30 so that a slight motion of the bar 15 in a forward direction causes the collar 30 to rest against the abutment 33 in which position further movement forward of the bar 15 causes disengagement between the teeth 23 and the dog 32. Upon such disengagement the bar 15 may be lowered to allow the headrest to be replaced within the cavity above the center panel 13.

The headrest and associated bar 15 may be raised simply by exerting upward force on the headrest, the teeth 23 by their special shape being able to slide upwardly under the dog 32.

By reason of the provision of the spring 31 and the link 16 with the associated frictional pivots 17 and 18, this headrest substantially eliminates fatigue of the neck muscles and is particularly useful in vehicles where such fatigue is a detriment to safe driving.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In combination in a seat, a backrest having a top portion and having a padded front portion and a rigid back portion spaced therefrom, said top portion having a recess therein communicating with the space between the front and back portions, a headrest shaped to fit into said recess and to provide with said top portion a smooth contour when so fitted into said recess, means for supporting said headrest in movable relation to said backrest, said supporting means including a substantially vertical channel having the open face thereof facing the back portion, a first pivotal connection between the lower end of said channel and said rigid back portion, said pivotal connection being oriented for pivotal motion of said channel toward and from said back portion, a bar slidable in said channel and having ratchet teeth along the exposed edge thereof, a toothed dog supported on said channel for movement to and from said teeth on said bar, a spring mounted on said channel to press said dog into engagement with said teeth on said bar, a dog release handle attached to said dog and extending through the back portion of said backrest, a compression spring mounted between said channel and said rigid back portion above said first pivotal connection thereby to urge said channel and bar away from said back portion, a link, a second pivotal connection between said link and the upper end of said bar, and a third pivotal connection between said headrest and the other end of said link, said second and third pivotal connections having axes of rotation substantially parallel with that of said first pivotal connection.

2. In combination in a seat, a backrest including a top portion, a padded front portion, and a rigid back portion spaced from said front portion, said top portion having a recess therein communicating with the space between the front and back portions, a headrest shaped to fit into said recess and to provide with said top portion a smooth contour when fitted into said recess, means for supporting said headrest in movable relation to said backrest, said supporting means including a substantially vertical channel having the open side thereof facing the back portion, a first pivotal connection between the lower end of said channel and said rigid back portion, said pivotal connection being oriented for pivotal movement of said channel toward and from said back portion, a bar slidable in said channel and having ratchet teeth along the exposed edge thereof, a toothed dog, a dog release collar supported from and slidable across said channel and supporting said toothed dog adjacent said toothed ratchet, said release collar extending beyond said channel toward said padded front portion, a spring mounted on said channel to press said dog into engagement with said ratchet teeth, a stop member rigidly supported from said back portion and disposed in the path of motion of said collar at the forward extremity of the path of motion of said channel, a compression spring mounted on said channel and said back portion above said pivotal connection thereby to urge said channel and bar away from said back portion, a link, a second pivotal connection between said link and the upper end of said bar, a friction clamp associated with said second pivotal connected to resist angular motion between the link and the bar and a third pivotal connection between said headrest and the other end of said link, said second and third pivotal connections having axes of rotation substantially parallel with that of said first pivotal connection, whereby said headrest may be moved forward to bring said dog release collar into contact with said stop member, thereby to allow said headrest to be lowered into said recess.

EUGENE F. McDONALD, Jr.

REFERENCES CITED

The following references are of record in the file of this patent:

UNITED STATES PATENTS

| Number | Name | Date |
|--------|------|------|
| 569,078 | Barker | Oct. 6, 1896 |
| 805,863 | Knight | Nov. 29, 1905 |
| 1,837,406 | Campbell | Dec. 22, 1931 |
| 1,871,184 | Kochs | Aug. 9, 1932 |
| 2,158,183 | Hascham | May 16, 1939 |

Certificate of Correction

Patent No. 2,466,553.  April 5, 1949.

EUGENE F. McDONALD, Jr.

It is hereby certified that error appears in the printed specification of the above numbered patent requiring correction as follows:

Column 4, line 54, claim 2, for the word "connected" read *connection*;

and that the said Letters Patent should be read with this correction therein that the same may conform to the record of the case in the Patent Office.

Signed and sealed this 30th day of August, A. D. 1949.

[SEAL]

THOMAS F. MURPHY,
*Assistant Commissioner of Patents.*